Figures 2, 3, 8:
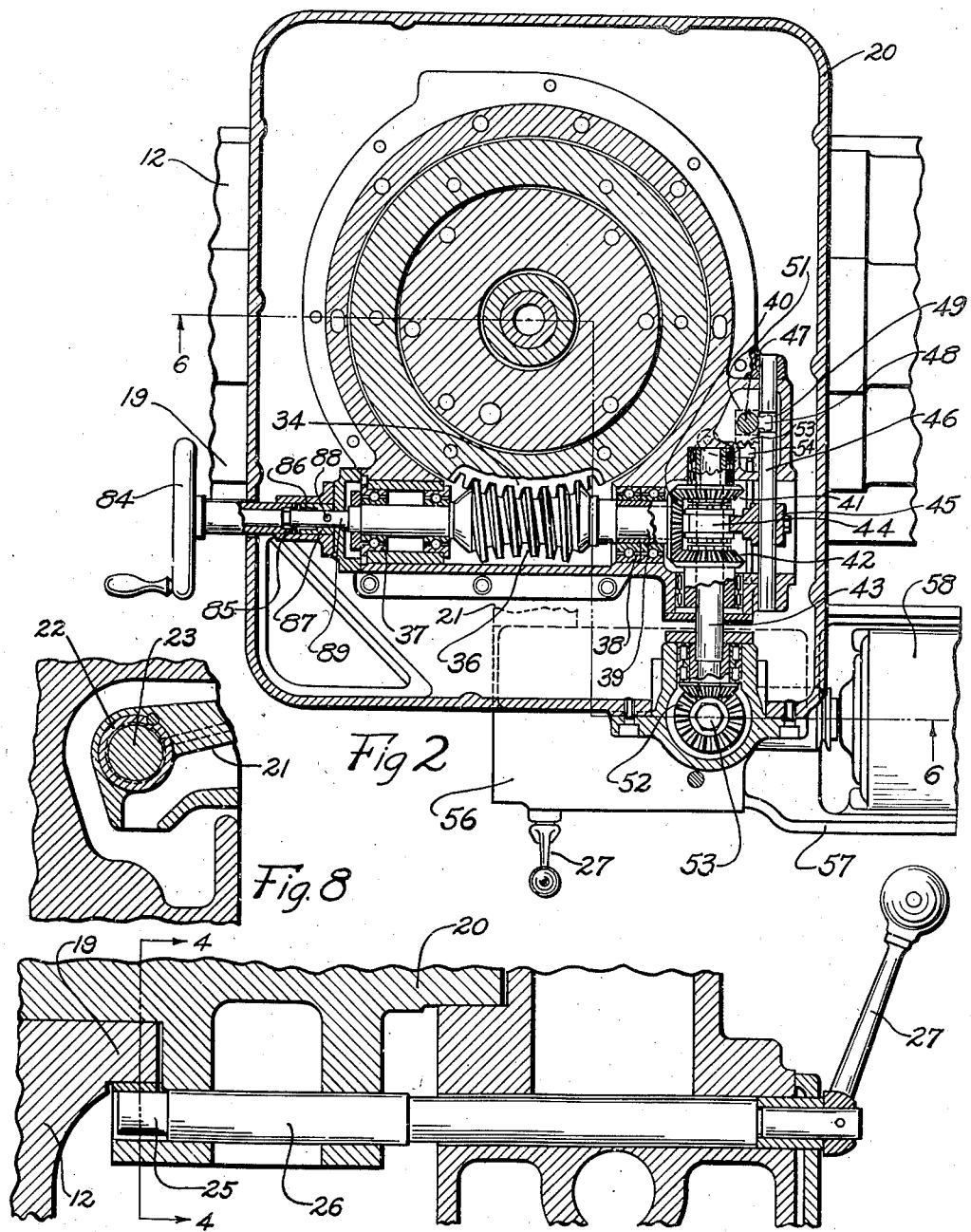

Dec. 12, 1944.  W. HOIER  2,365,078
ROTARY TABLE ATTACHMENT FOR MILLING MACHINES
Filed May 27, 1942  3 Sheets-Sheet 1
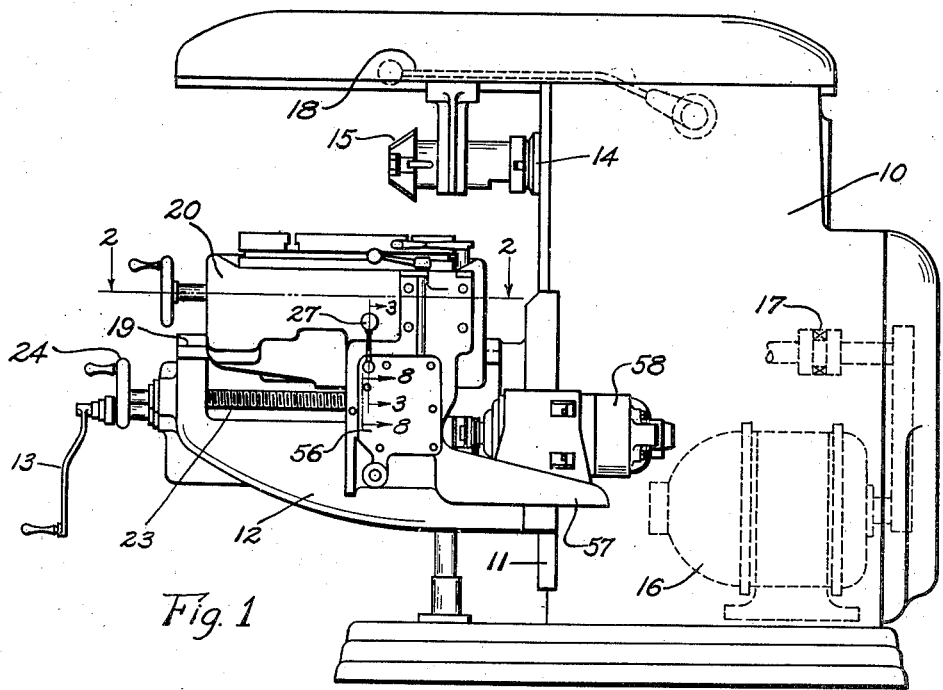
Fig. 1
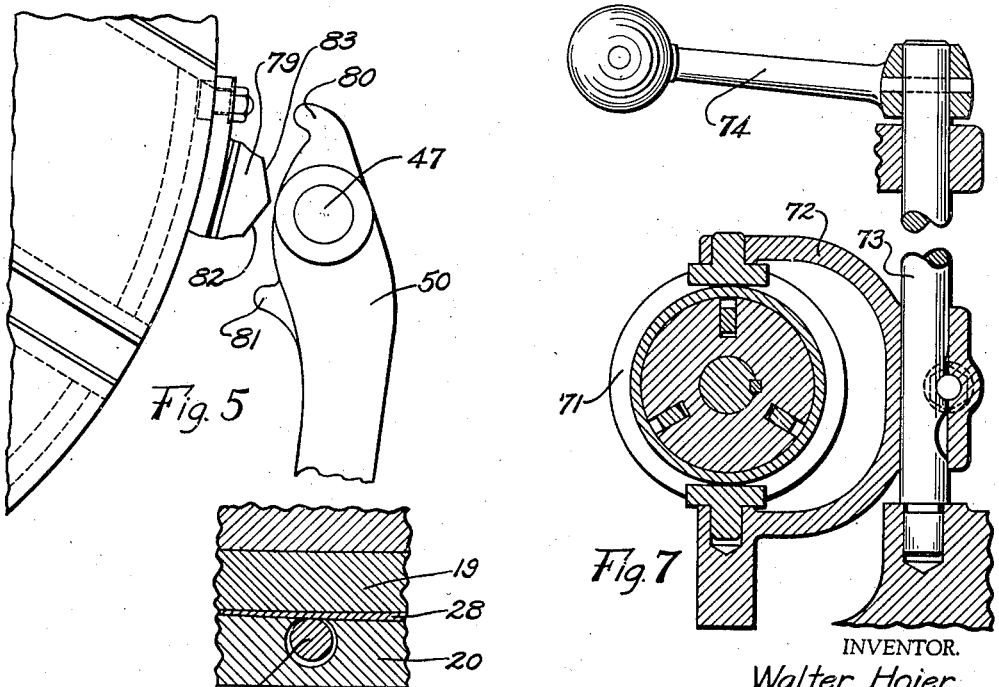
Fig. 5
Fig. 7
Fig. 4
INVENTOR.
Walter Hoier
BY
A. H. Parsons
ATTORNEY Dec. 12, 1944.  W. HOIER  2,365,078
ROTARY TABLE ATTACHMENT FOR MILLING MACHINES
Filed May 27, 1942  3 Sheets-Sheet 2

INVENTOR.
Walter Hoier
BY
ATTORNEY

Dec. 12, 1944.  W. HOIER  2,365,078
ROTARY TABLE ATTACHMENT FOR MILLING MACHINES
Filed May 27, 1942  3 Sheets-Sheet 3

INVENTOR.
Walter Hoier
BY
O. H. Parsons
ATTORNEY

Patented Dec. 12, 1944

2,365,078

UNITED STATES PATENT OFFICE 2,365,078

ROTARY TABLE ATTACHMENT FOR MILLING MACHINES

Walter Hoier, Cincinnati, Ohio, assignor to The Cincinnati Milling Machine Co., Cincinnati, Ohio, a corporation of Ohio Application May 27, 1942, Serial No. 444,694

3 Claims. (Cl. 90—20)

This invention relates to machine tools and more particularly to improvements in milling machines.

One of the objects of this invention is to provide an improved rotary table attachment for milling machines and the like.

Another object of this invention is to provide an improved rotary table attachment which may be built as a self-contained unit having its own prime mover, transmission and control mechanism.

A further object of this invention is to provide a circular table attachment for a knee and column type milling machine which is designed to replace the present saddle and table of such machines, thereby providing a rotary table machine which has the same clearance as a reciprocating table machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 6:
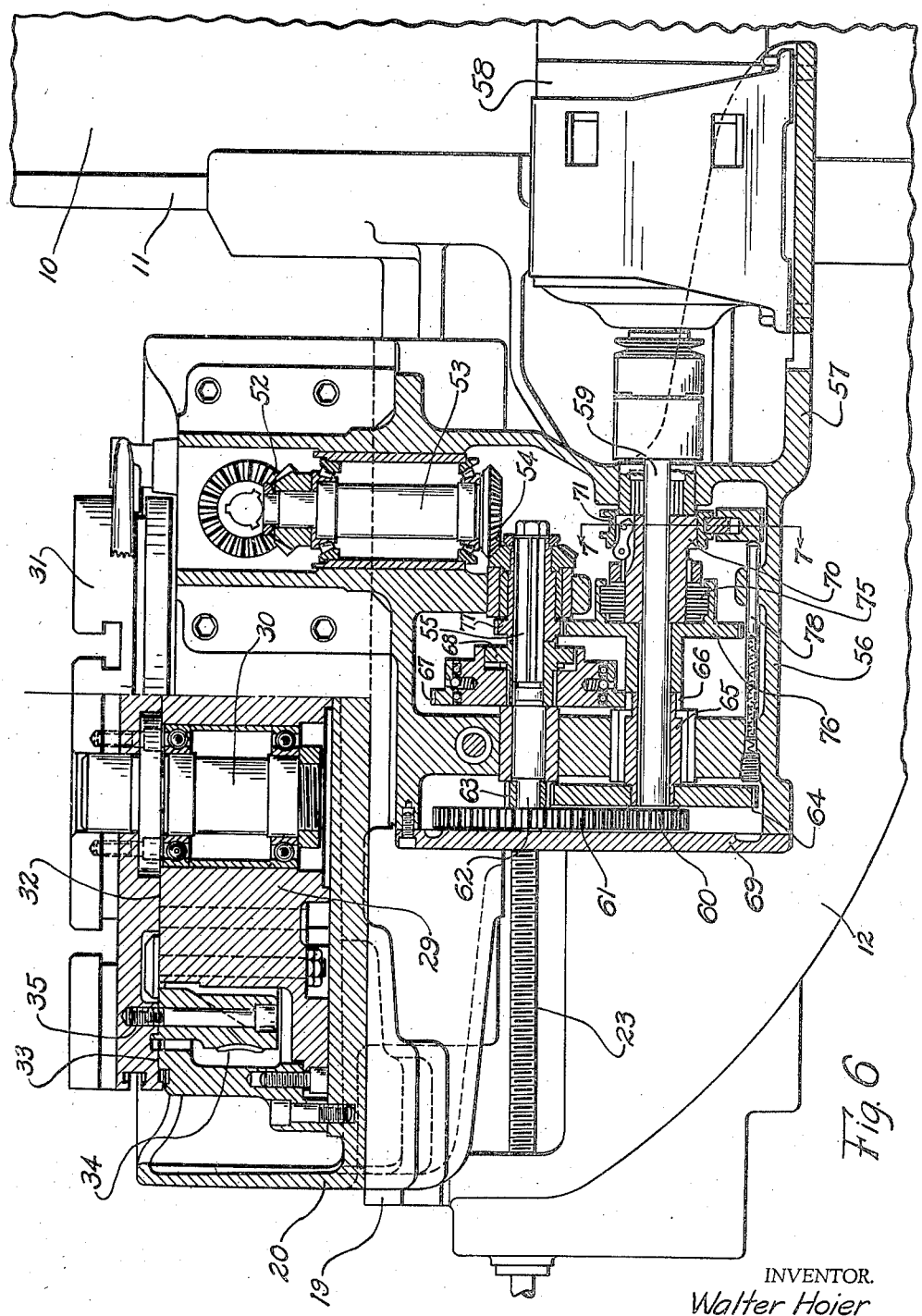

Figure 2 is a section on the line 2—2 of Figure 1.
Figure 3 is a section on the line 3—3 of Figure 1.
Figure 4 is a section on the line 4—4 of Figure 3.
Figure 5 is an enlarged detail view of the trip control mechanism.
Figure 6 is a section on the line 6—6 of Figure 2.
Figure 7 is a section on the line 7—7 of Figure 6.
Figure 8 is a section on the line 8—8 of Figure 1.

This invention deals with a rotary table attachment for machine tools and more particularly for milling machines, and it has particular utility in connection with converting reciprocating table type milling machines into rotary milling machines. Conventional knee and column type milling machines have a reciprocating table which is mounted on a saddle for cross adjustment, the saddle in turn being mounted on a knee for vertical adjustment, and when rotary milling operations were to be performed on such machines a rotary table attachment was applied to the top of the reciprocating table. This required portable drive connections for transmitting power to the table, and also reduced the clearance or work capacity of the machine. By means of this invention the conventional table and saddle are removed and the present attachment applied directly to the knee of the machine. Since the attachment has its own self-contained prime mover and transmission mechanism it is not necessary to make any portable driving connection and, in addition, the work capacity of the machine is not reduced and in fact it may be slightly increased. From a manufacturing standpoint, it makes it possible to provide the same basic elements such as the knee and the column for either a rotary or plain table machine.

Referring now to Figure 1 of the drawings the reference numeral 10 indicates the column of a conventional knee and column type milling machine, said column having vertical guideways 11 upon which a knee 12 is mounted for vertical adjustment. This adjustment may be effected through rotation of a hand lever 13 which is operatively connected to a knee elevating screw which is not shown.

The column 10 has a cutter spindle 14 journaled therein and adapted to drive a suitably formed cutter 15. The spindle may be driven by a prime mover 16 mounted within the column and adapted to be operatively connected to the spindle through the medium of a start and stop clutch 17 which is controlled by the start and stop control lever 18.

The knee 12 has horizontal guide surfaces 19 arranged on the top thereof in parallel relation to the axis of the cutter spindle 14 and it is upon these guideways that the attachment constituting this invention is adapted to be mounted. The attachment comprises a base member 20 which has guideways on the underside thereof, which are complementary in form to the guideways 19 of the knee. The base member 20 has a laterally extending lug 21 which carries a nut 22 for operative connection with the cross screw 23, Figure 8, which is journaled in the knee and rotatable by the hand wheel 24. By means of this connection the attachment may be adjusted relative to the knee and in a plane parallel to the axis of the cutter spindle.

As shown in Figure 3, the saddle may be clamped to the knee after adjustment by means of an eccentric 25 which is secured to the end of a shaft 26, the shaft being provided with an operating handle 27. As shown in Figure 4, a gib 28 is interposed between the eccentric 25 and the underside of the knee guideway and by adjusting the gib the degree of clamping pressure may be varied.

Referring to Figure 6, the base 20 is provided with an upstanding boss 29 in the center of which is anti-frictionally journaled the shaft 30 which is operatively connected and depends from the underside of a table 31. The table has annular surfaces 32 and 33 by which it is supported for rotation on the boss 29.

A worm wheel 34 is attached to the underside of the table as by suitable bolts 35 as shown in Figure 6. This worm wheel intermeshes with a worm 36 which is supported at opposite ends in antifriction bearings 37 and 38 of the base 20. The journal portion 39 formed on one end of the worm has a bevel gear 40 keyed thereto which is in constant mesh with a pair of oppositely arranged bevel gears 41 and 42. The gears 41 and 42 are supported for free rotation on a shaft 43 and are alternately connectable to the shaft by a shiftable reversing clutch 44 which is splined on the shaft between the gears. A shifter fork 45 attached to a shifter rod 46 serves to shift the clutch in opposite directions for determining the direction of rotation of the table. A vertically arranged shaft 47 has a lug 48 which operatively engages a slot 49 formed in the shifter rod 46 and the upper end of the shaft is fitted with a control lever 50 shown in Figure 5. The shaft also carries a detent block 51, shown in Figure 2, in which is formed a series of V-notches 53 for engagement by a spring-pressed detent 54. This serves to hold the clutch in its various positions. It will be noted that there are three notches which means that the clutch not only has two operating positions but also a central or neutral position in which it may be held for stopping purposes.

The shaft 43 is operatively connected through beveled gearing 52 to a vertical shaft 53 which is more particularly shown in Figure 6. This shaft is operatively connected through bevel gearing 54 to a horizontal shaft 55. The shaft 55 is journaled in a feed box 56 which depends from the base 20 at one side of the knee 12. The feed box 56 contains mechanism for determining different rates of operation of the table including a plurality of slow or feeding rates, or a fast or rapid traverse rate. The feed box 56 is provided with a rearwardly extending shelf 57 upon which is mounted a prime mover 58.

It will be noted that the prime mover is bodily movable with the support 20 as well as vertically movable with the knee 12, and therefore it is not necessary to provide any flexible drive connections between the motor and the gear box. The motor armature shaft 59 extends through the gear box and is provided on the end with a removable pinion 60. The pinion 60 intermeshes with a gear 61 supported for free rotation on the shaft 62. The gears 60 and 61 constitute a pair of change gears and are removable so that gear pairs of other ratios may be substituted, thus making it possible to obtain a series of different feed rates of rotation for the table.

The gear 61 is operatively connected to a gear 63 which, in turn, drives a gear 64 supported for free rotation relative to the shaft 59 but operatively connected through a sleeve 65 to a pinion 66. The pinion intermeshes with a gear 67 which is operatively connected to the spline shaft 55 through an overdrive clutch 68. Thus, the shaft 55 may be driven at any one of several feed rates. The gear box has a removable cover 69 by means of which the feed rate change gears may be interchanged or other gears substituted therefor.

The motor shaft 59 also drives a friction clutch 75 member 70 which has a clutch spool 71 that is shiftable by a shifter fork 72 as more particularly shown in Figure 7. The shifter fork is connected to a rotatable shifter rod 73 that has an operating handle 74 attached to the upper end thereof. A multiple disc friction clutch 75 is adapted to be operated by the clutch spool for connecting the shaft 59 to a rapid traverse drive gear 76. This gear intermeshes with a pinion 77 which is integral with the overdrive clutch 68 whereby even although the gear 67 is being rotated at a slow rate, the rapid traverse gear 76 may overdrive the shaft 55 at a fast rate. The clutch member 70 is normally held in a disengaged position by a spring pressed plunger 78.

It will now be obvious that the table is started and stopped by means of control lever 50 which also determines the direction of table rotation; that the rate of rotation for feeding is determined by the change gears, and that rapid traverse movements are obtained by the lever 74.

The table may be automatically stopped by a dog or dogs 79 applied to the table as shown in Figure 5 for operating on the lug 80 or 81 carried by the lever 50. It will be noted that the dog has two angular faces 82 and 83 for engagement with the respective lugs 80 and 81. If the table is rotating clockwise the face 82 engages the lug 80 while if the table is rotating counterclockwise, the face 83 engages the lug. For instance, the lever 50 is rotated counterclockwise to cause clockwise rotation of the table. This moves the lug 80 behind the dog, otherwise the dog would trip the lever as soon as it started to move. It will be obvious that if only a partial rotation of the table is desired, two dogs would be utilized.

When the clutch 44 is in a neutral position, the table may be rotated manually by the handwheel 84 which has clutch teeth 85 engageable with clutch teeth 86 on a sleeve 87 pinned at 88 to shaft 89 integral with the worm 36.

In the operation of the machine, a work piece is attached to the table and fed into engagement with the cutter by rotation of the hand wheel 84, the saddle is then clamped, and the table power rotated by throwing lever 50. A second dog in the table automatically stops it after a predetermined arc of revolution. The table may then be returned by hand or by power and if by the latter, rapid traverse is available by throwing lever 74.

What is claimed is:

1. A rotary table attachment for a knee and column type milling machine comprising a base member having bottom, top and sides, guideways formed on the bottom of said member complementary to guideways of a knee upon which the attachment is to be mounted, a circular rotary table, means in the top of said member for supporting and journaling said table, a gear box formed integral with one of the sides of said member, a bracket projecting from said gear box and forming a shelf, a drive motor mounted on said shelf, transmission means mounted in said gear box including an output shaft, and means for driving the same from said motor at fast and slow rates, means on the top of said member including a reverser operatively connected to said output shaft for driving said table and controls for said transmission mounted on the base member including a rate selector operable at will and a control for said reverser whereby said attachment constitutes a self-contained operative unit for application to a milling machine.

2. In a milling machine having a column, a knee slidably mounted on the column and a cutter spindle journaled in the column, the combination of a rotary table attachment adapted to be mounted on said knee, means carried by the knee and adapted to be operatively connected to said attachment for adjustment thereof parallel to the axis of the cutter spindle, means to adjust the knee and thereby the attachment in a direction laterally of the axis of the cutter spindle, said attachment including a base member having guideways formed on one side thereof complementary to the knee guideways, a rotary table, means on the other side of said member for rotatably supporting said table, means integral with the side of said base member forming a gear box, a bracket projecting from said box, a prime mover mounted on said bracket, a first shaft driven by said prime mover and journaled in said gear box, an output shaft, rate change gearing operatively connecting the first shaft for rotation of the output shaft at fast or slow rates, a reversing clutch connected to said output, and operatively connected for rotation of the table in opposite directions, and means for holding said reversing clutch in a neutral position for stopping said table.

3. In a milling machine having a column, a knee slidably mounted on the column and a cutter spindle journaled in the column, the combination of a rotary table attachment adapted to be mounted on said knee, said attachment including a base member having guideways complementary to the guideways on the knee for adjustment parallel to the axis of the spindle, a circular rotary table, an upstanding boss formed on the top of the base member, spaced annular guide surfaces formed on the top of said base member for supporting said table, a shaft depending from the underside of said table and anti-frictionally supported in said boss, a worm gear formed integral with the table, a worm anti-frictionally supported on the top of said member in operative engagement with said worm gear, a reversing mechanism attached to one end of said worm, a hand wheel attached to be clutched and declutched with the other end of said worm for manual rotation of the table, a gear box depending from the side of said base member, a bracket projecting rearwardly from said box, a motor mounted on said bracket, said motor having an armature shaft extending within said gear box, a feed drive pinion and a rapid traverse clutch mounted on said shaft, a gear train extending from said pinion to said reversing mechanism and including rate change gears and an overdrive clutch in series, means including a control lever for connecting said rapid traverse clutch to said overdrive clutch, a second control lever operatively connected for actuating said reverser and mounted adjacent the side of said table, and trip dogs carried by the table for automatically shifting said reverse lever to a neutral position for stopping rotation of the table regardless of its direction of rotation.

WALTER HOIER.